Sept. 7, 1943.   N. W. NELSON   2,328,738
BRAKE SHOE
Filed April 28, 1941
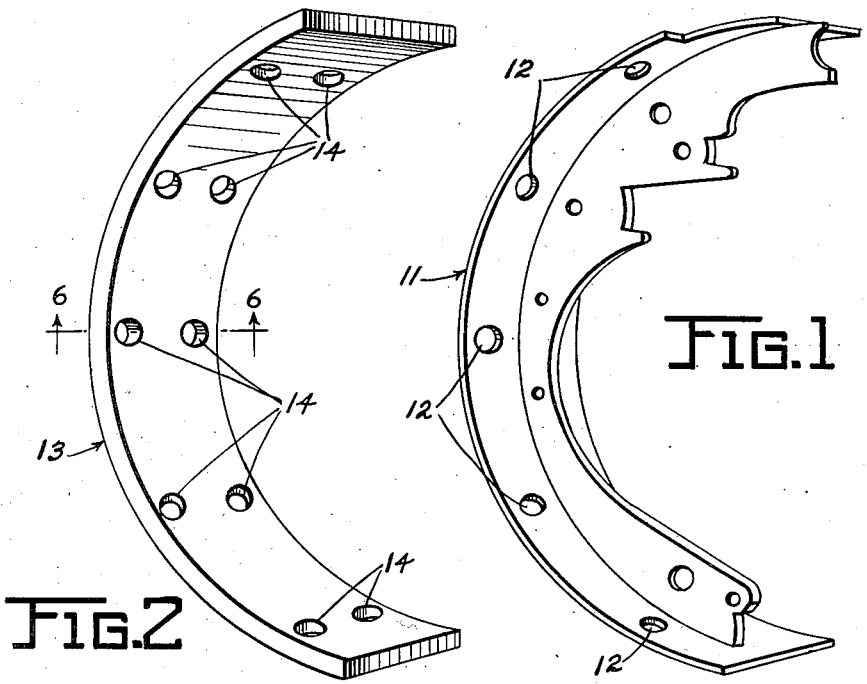
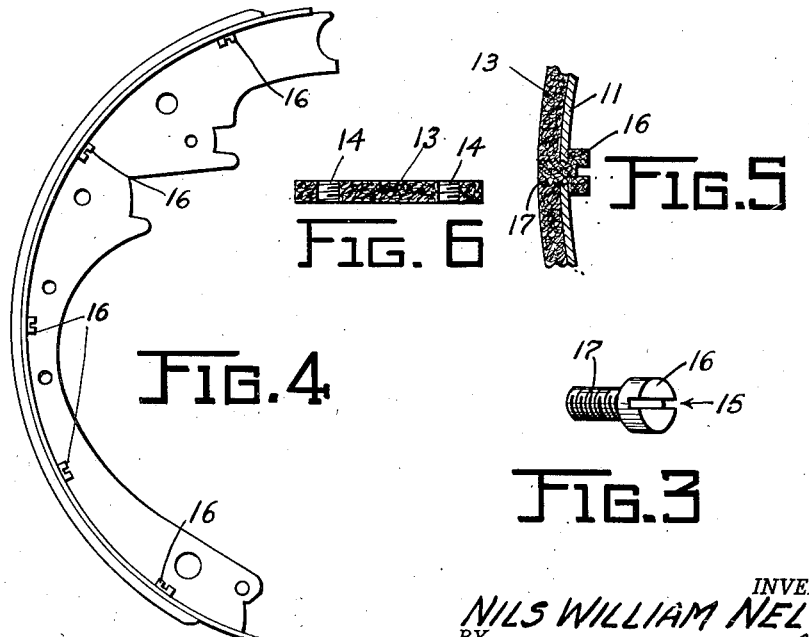
INVENTOR
NILS WILLIAM NELSON
BY
ATTORNEY Patented Sept. 7, 1943

2,328,738

UNITED STATES PATENT OFFICE 2,328,738

BRAKE SHOE

Nils William Nelson, Colonie, N. Y., assignor to Bendix Aviation Corporation, South Bend, Ind., a corporation of Delaware Application April 28, 1941, Serial No. 390,683

3 Claims. (Cl. 188—234)

This invention relates to the formation of friction means or shoes for brakes and more particularly to novel means for securing a brake lining to a brake shoe.

My improved means for securing a brake lining to a brake shoe consists of fastenings made of brake lining material, and preferably dipped in resin or the like before insertion in the lining. The use of bolts or screws or the like made from lining material has several important advantages including the elimination of rivets from the shoe structure, the possibility of forming a shoe without openings in the lining face thereby increasing the friction area, the deadening of squeal in the brake owing to inertia of the bolt heads, and the possibility of forming brake shoe lining which can be safely worn until the metal face of the shoe is reached without scoring the drum thereby tremendously increasing the effective life of the lining.

Other advantages of my invention will be apparent from the following description, accompanied by the illustrative drawing, in which:

Figure 1 shows in perspective the metal portion of a brake shoe before the lining is attached;

Figure 2 shows a strip of brake lining before attachment to the shoe;

Figure 3 shows a sample bolt of the kind used by me to secure lining and metal shoe together;

Figure 4 shows the assembled unit with the metal portion of the shoe and the lining held together by my improved bolts;

Figure 5 shows in section a close-up of a portion of the assembled brake shoe unit of Figure 4; and Figure 6 is a section taken on the line 6—6 of Figure 2.

The customary practice followed in preparing brake shoes for use is as follows: The metal portion of the shoe is formed to the desired shape by cutting, rolling and associated processes. Then holes are punched or drilled in the face of the metal portion for accommodating the rivets which are later used in securing the friction material or lining to the face of the metal part of the shoe. Brake lining usually consists of a mixture of synthetic resin material with asbestos and other base materials, which have a desired high coefficient of friction. The resin and base materials are mixed in a plastic state and the lining is formed by extrusion through a die, and then cutting in lengths and heating, or by heating this mixture in molds which hold it to the desired form. The material used in forming the lining may be handled in the form of a dry mixture, using powdered material. The heating hardens and integrates the mixture, especially by curing the synthetic resin, to form an effective friction element for use in a brake. While the lining is still being handled separately it is counterbored to provide openings for the bodies of the rivets as well as larger openings into which the heads of the rivets can sink. The lining is then placed against the face of the metal portion of the shoe, the rivets are countersunk through the aligned holes in the lining and metal portion of the shoe with the head of the rivet in the lining, and the ends of the rivet which protrude through the metal portion are flattened to hold the lining in place.

My invention contemplates the use of material of the same general type as the brake lining or friction material in making bolts or screws or similar fastenings which will be used to hold the brake lining to the metal part of the shoe. To do this I take either a synthetic resin plastic material or a mixture of resin and lining material similar to that used in forming the lining and form threaded screws of this mixture or material. Forming the screws may be accomplished by molding the mixture in bar form then cutting it to the proper shape and providing it with a thread as desired. Alternatively the screws may be formed from the plastic by die casting to give them the desired shape. These screws may then be dipped in a resin. However, the dipping process may be eliminated without seriously affecting the efficacy of the screws or fastenings. After being dipped in resin the bolts are used to hold together the lining and metal portion of the shoe, with the heads of the screws seated against the back face of the shoe rim, and with the threads embedded in the body of the lining. The screws may be made from resin alone, from friction material, or they may be made from wood or from a combination of wood and resin. A variety of other materials of the same general type are also useable.

As shown in Figure 1, the metal portion 11 of the shoe may be separately formed in accord with the customary practice, with openings 12 provided for accommodating the lining material bolts.

As shown in Figure 2, the brake lining 13 is separately formed with a plurality of openings 14 therethrough adapted to be aligned with openings 12 through the metal portion of the shoe. The openings in the lining, as shown, are provided with internal threads to accommodate the threads of the lining material screws 15. These screws, made from the lining material and dipped in resin (a sample and illustrative screw being shown in Figure 3) are then inserted through the metal face of the shoe from the back and are screwed into the lining so that the head 16 of the screw is on the back face of the shoe rim, i. e., is on the same side of the metal face of the shoe as is the shoe web, and the end 17 of the screw is substantially flush with the outer face of the brake lining, at least after grinding. Figure 4 shows a brake shoe with attached lining formed in accordance with my invention.

As is well known, considerable heat is developed during braking. The effect of the heat so developed would be to bake to hard form the resin into which the lining material fastenings have been dipped with the result that the fastenings will gain in strength and solidity, and the outer surface of the lining will be exceptionally smooth and without holes or openings of any sort and its effective area is therefore greatly increased. A common cause of drum scoring in the past has been the accumulation of water and foreign material in the holes which are necessitated by countersinking of the rivets. Since my device entirely eliminates the use of such holes in the lining, danger of drum scoring on this account will be eliminated. Further the elimination of the holes in the lining left by the rivet heads greatly increases the life of the lining because there is no opportunity for the collection of abrasive materials in rivet head holes, which abrasive materials not only wear the drum, but the lining as well. At the same time it will be possible to wear the lining all the way down until the metal surface of the shoe is reached without scratching or scoring the drum. In the past it has always been necessary to allow the heads of the rivets to protrude a certain distance above the metal surface of the shoe.

It has also been found that in a brake having shoes assembled in accordance with my invention there is substantially less likelihood of squeal. One reason for this is the elimination of the metal rivets, a second reason is the closing of the holes in the lining, and a third reason is the use of fastenings having heads of fairly large mass.

It will further be appreciated that my invention makes it possible to eliminate the use of rivets entirely and that it allows the use of lining holding members which will be welded integral with the lining as the brake is used.

The use of my invention can conceivably be advantageous in many ways other than those particularly described herein. It is therefore my intention not to limit my invention otherwise than by the terms of the appended claims.

I claim:

1. The method of securing a brake lining to a shoe, which comprises temporarily attaching the lining to the shoe by means of a plastic securing member extending through both and dipped in thermoplastic liquid, and utilizing the heat of braking to cause the liquid to set and thereby cause the securing member to adhere permanently to the lining.

2. A friction element for use in a brake or the like comprising a metal shoe, a strip of lining material and a threaded fastening securing the lining material to the shoe composed of lining material having a resin coating.

3. The method of securing a brake lining to a brake shoe which comprises forming a securing member of plastic material, dipping said securing member in thermo plastic liquid, temporarily attaching the lining to the shoe by positioning the securing member to extend through both lining and shoe, and utilizing the heat of braking to cause the liquid to set and thereby cause the securing member to adhere permanently to the lining.

NILS WILLIAM NELSON.